United States Patent
Choi et al.

(10) Patent No.: US 11,585,720 B2
(45) Date of Patent: Feb. 21, 2023

(54) DEVICE FOR INSPECTING WATERPROOFNESS

(71) Applicants: LG Electronics Inc., Seoul (KR); DMC CO., LTD, Gyeonggi-do (KR)

(72) Inventors: Juyoung Choi, Seoul (KR); Dongeon Kim, Seoul (KR); Jaehun Kim, Seoul (KR); Daeyong Seong, Seoul (KR)

(73) Assignees: LG Electronics Inc., Seoul (KR); DMC CO., LTD, Gyeonggi-do (KR)

( * ) Notice: Subject to any disclaimer, the term of this patent is extended or adjusted under 35 U.S.C. 154(b) by 218 days.

(21) Appl. No.: 16/982,427

(22) PCT Filed: Oct. 8, 2018

(86) PCT No.: PCT/KR2018/011827
§ 371 (c)(1),
(2) Date: Sep. 18, 2020

(87) PCT Pub. No.: WO2019/182214
PCT Pub. Date: Sep. 26, 2019

(65) Prior Publication Data
US 2021/0018395 A1    Jan. 21, 2021

(30) Foreign Application Priority Data
Mar. 20, 2018    (KR) .......................... 10-2018-0031995

(51) Int. Cl.
*G01M 3/32*    (2006.01)
*B25B 11/02*    (2006.01)

(52) U.S. Cl.
CPC .............. *G01M 3/32* (2013.01); *B25B 11/02* (2013.01)

(58) Field of Classification Search
CPC .......... G01M 3/26; G01M 3/32; G01R 31/69; F04B 27/04; F04B 35/04; H01R 13/5219;
(Continued)

(56) References Cited

U.S. PATENT DOCUMENTS 5,677,479 A * 10/1997 Igura ....................... G01M 3/26
73/40

FOREIGN PATENT DOCUMENTS

CN    102721517    10/2012
CN    103471790    12/2013
(Continued)

OTHER PUBLICATIONS

Office Action in Chinese Appln. No. 201880091033.8, dated Dec. 31, 2021, 17 pages (with English translation).
(Continued)

*Primary Examiner* — Nimeshkumar D Patel
*Assistant Examiner* — Gedeon M Kidanu
(74) *Attorney, Agent, or Firm* — Fish & Richardson P.C.

(57) ABSTRACT

A device for inspecting waterproofness of an object includes a lower jig and an upper jig configured to support the object to be inspected, inspection modules configured to contact an outer surface of the object, and an air compressor configured to supply air to the inspection modules. Each of the inspection modules includes a jig that is configured to contact the outer surface of the object and defines a chamber configured to communicate air, a valve defining a passage in communication with the chamber, an air supply line connecting the valve to the air compressor and configured to guide air to the passage, and a pressure sensor connected to the valve and configured to detect an air pressure in the passage.

18 Claims, 5 Drawing Sheets

(58) Field of Classification Search
CPC . H01R 2201/20; H01R 43/005; H05K 5/0095
See application file for complete search history.

(56) References Cited

FOREIGN PATENT DOCUMENTS

| | | | |
|---|---|---|---|
| CN | 204855118 | | 12/2015 |
| CN | 204855118 U | * | 12/2015 |
| CN | 205449404 | | 8/2016 |
| CN | 205449404 U | * | 8/2016 |
| CN | 206378255 | | 8/2017 |
| CN | 209102306 | | 7/2019 |
| JP | H05-027740 U | | 4/1993 |
| KR | 101457075 | | 10/2014 |
| KR | 1020140124691 | | 10/2014 |
| KR | 101489789 | | 2/2015 |
| KR | 101564769 | | 11/2015 |
| KR | 101566691 | | 11/2015 |
| KR | 101566691 B1 | * | 11/2015 |
| KR | 20160003412 A | * | 1/2016 |
| KR | 102016001143 8 | | 2/2016 |
| KR | 101598849 | | 3/2016 |

OTHER PUBLICATIONS

PCT International Search Report in International Appln. No. PCT/KR2018/011827, dated Oct. 8, 2018, 7 pages (with English translation).
Korean Office Action in Korean Appln. No. 10-2018-0031995, dated Mar. 20, 2018, 10 pages (with English translation).

* cited by examiner

DEVICE FOR INSPECTING WATERPROOFNESS

CROSS-REFERENCE TO RELATED APPLICATIONS

This application is a National Stage application under 35 U.S.C. § 371 of International Application No. PCT/KR2018/011827, filed on Oct. 8, 2018, which claims the benefit of Korean Patent Application No. 10-2018-0031995, filed on Mar. 20, 2018. The disclosures of the prior applications are incorporated by reference in their entirety.

TECHNICAL FIELD

The present disclosure relates to a device for inspecting waterproofness, and more particularly, to a device for inspecting a waterproof performance of an object.

BACKGROUND

Electronic devices such as terminals may be subjected to a waterproofness inspection after a product assembly is completed, and products without waterproof defects may be released.

The waterproofness inspection may be performed by a waterproofness inspection device, and the waterproofness inspection device may inspect a degree of leakage (waterproof performance) of an object using air.

For example, a waterproofness inspection device may include a protrusion having an inlet hole through which high-pressure air is introduced, a body having a jig block that fixes a semi-finished product in place, a cover covering the upper part of the body, a sealing means defining a sealed chamber space capable of inspecting the waterproofness of parts of the semi-finished product, an adsorption port that adheres to the outer surface of the injection product in the semi-finished product, and a pressure sensor provided in the inner space of the adsorption port to detect a pressure change. The waterproofness inspection device may inspect the waterproofness of the semi-finished product by the pressure change of the pressure sensor.

SUMMARY

The present disclosure describes a waterproofness inspection device capable of inspecting a leakage location and a leakage degree of an object with a simple structure.

According to one aspect of the subject matter described in this application, a device is configured to inspect an object and includes a lower jig configured to support the object to be inspected, an upper jig configured to contact an upper surface of the object and press the object toward the lower jig, a plurality of inspection modules configured to contact an outer surface of the object, and an air compressor configured to supply air to the plurality of inspection modules. Each of the plurality of inspection modules includes a jig that is configured to contact the outer surface of the object and defines a chamber configured to communicate air, a valve that defines a passage in communication with the chamber, an air supply line that connects the valve to the air compressor and is configured to guide air to the passage, and a pressure sensor connected to the valve and configured to detect an air pressure in the passage.

Implementations according to this aspect may include one or more of the following features. For example, a width of the jig may be larger than an opening defined in a main body of the object, and may have a surface configured to face the outer surface of the object and to cover an area between the main body of the object and a sub-body of the object disposed in the opening. In some examples, the chamber may include a communication passage that is in communication with the passage of the valve, and a groove that is recessed from the surface of the jig toward the communication passage, that is connected to the communication passage, and that is configured to face the object. A width of the groove may be larger than widths of the communication passage and the opening of the object, and the groove may be configured to be spaced apart from the sub-body of the object.

In some implementations, the jig may include a main body contact end that is disposed at the surface of the jig facing the object and that is configured to contact an outer surface of the main body of the object. In some examples, the jig may include an upper jig contact end configured to contact an outer surface of the upper jig, and a lower jig contact end configured to contact an outer surface of the lower jig. In some implementations, the jig, the valve, and the pressure sensor may be disposed in a row.

In some implementations, the valve may include a first surface facing the jig, and a second surface facing the pressure sensor. In some examples, the passage of the valve may include a pressure sensing passage that extends from the first surface to the second surface of the valve and is in communication with the chamber of the jig, and an air supply passage that is in communication with the pressure sensing passage and connected to the air supply line.

In some examples, the pressure sensing passage of one of the plurality of inspection modules may be a straight passage that extends along a longitudinal direction of the one of the plurality of inspection modules.

In some implementations, the device may include a controller connected to the pressure sensor of each of the plurality of inspection modules and configured to output data corresponding to the air pressure detected by the pressure sensor. In some examples, the controller may be configured to determine waterproofness of the object based on the data corresponding to the air pressure. In some examples, the controller may be configured to compare the data corresponding to the air pressure of the plurality of inspection modules, and to determine waterproofness of the object based on comparison of the data corresponding to the air pressure of the plurality of inspection modules.

In some implementations, the main body contact end may be recessed from the surface of the jig facing the object, and the chamber of the jig may include a groove that is recessed from the main body contact end in a direction away from the object, and a communication passage that is defined within the groove and extends to the passage of the valve.

In some implementations, the lower jig and the upper jig may be configured to contact the object to thereby define a sealed space with the object disposed between the lower jig and the upper jig, and outer surfaces of the lower jig and the upper jig may be configured to be positioned inward relative to the outer surface of the object.

According to another aspect, a device is configured to inspect an object including a main body having a plurality of openings and sub-bodies disposed in the plurality of openings. The device includes a lower jig and an upper jig that are configured to support the object and to define a sealed space with the object disposed between the lower jig and the upper jig, a plurality of inspection modules configured to be positioned at the plurality of openings of the object and to contact an outer surface of the object, and an air compressor configured to supply air to the plurality of inspection modules. Each of the plurality of inspection modules includes a pressure sensor configured to detect air pressure between one of the plurality of inspection module and the outer surface of the object.

Implementations according to this aspect may include one or more of the following features or the features described above. For example, each of the plurality of inspection modules may further include a jig that is configured to contact the outer surface of the object and defines a chamber configured to communicate air, a valve that defines a passage in communication with the chamber, and an air supply line that connects the valve to the air compressor and is configured to guide air to the passage. The pressure sensor may be connected to the valve and configured to detect the air pressure in the passage of the valve.

In some implementations, the jig may be configured to cover an area between the main body of the object and one of the sub-bodies. In some examples, the jig may be configured to contact the upper jig, the lower jig, and the object disposed between the upper jig and the lower jig.

In some implementations, the device may include a controller connected to the pressure sensor of each of the plurality of inspection modules and configured to output data corresponding to the air pressure detected by the pressure sensor. For example, the controller may be configured to compare the data corresponding to the air pressure of the plurality of inspection modules, and to determine waterproofness of the object based on comparison of the data corresponding to the air pressure of the plurality of inspection modules.

In some implementations, inspection locations with a relatively large amount of leakage and leakage degree of each of the inspection locations may be inspected with high reliability according to a pressure detected by a pressure sensor of each of a plurality of inspection modules.

In some implementations, a jig of each of the plurality of inspection modules may fix the location of an object to be inspected and supply air between the object and the jig, thereby minimizing the number of parts.

In some implementations, where the passage of a valve guides air to a chamber of the jig and connects the pressure sensor with the chamber, the number of parts may be minimized and the structure may be simple.

In some implementations, where the pressure sensor detects pressure from the outside of the jig through the passage of the valve, it may be easy to perform the service operation of the pressure sensor or clean the jig.

DETAILED DESCRIPTION

Hereinafter, one or more implementations of the present disclosure will be described in detail with reference to the accompanying drawings.

Figure 1:
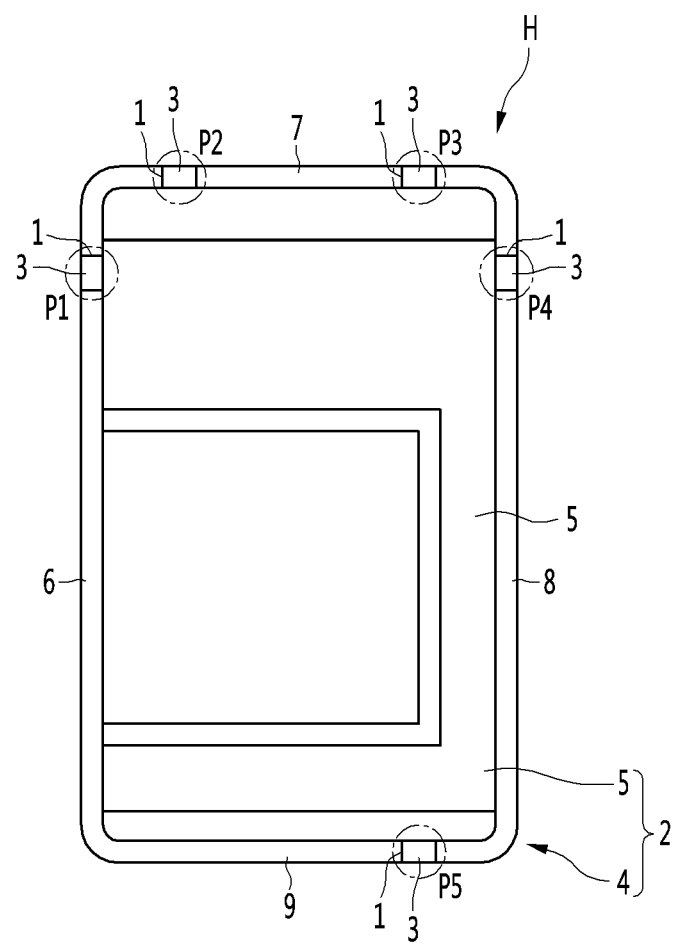
FIG. 1 is a diagram showing an example of an object that is to be inspected by a waterproofness inspection device.

FIG. 1 is a diagram showing an example of an object that is to be inspected by a waterproofness inspection device.

For example, an object H shown in FIG. 1 may include a main body 2 having a plurality of openings 1 formed therein, and sub-bodies 3 disposed in the openings 1. In some examples, the object H may be a housing that defines an outer appearance of an electronic device such as a terminal.

The openings 1 and the sub-bodies 3 may be in one-to-one correspondence, and the object H may be a structure in which one sub-body 3 is inserted into one opening 1.

The sub-body 3 may be mounted in the main body 2 so as to close the opening 1, and may be made of a material through which light or radio waves may pass. The main body 2 may be made of a resin material or a metal material, and the sub-body 3 may be made of a resin material.

The sub-body 3 may be inserted and fitted into the opening 1. The side of the sub-body 3 may be fixed in close contact with the main body 2. The sub-body 3 may be disposed to close the opening 1. When the sub-body 3 is mounted on the main body 2, a gap between the sub-body 3 and the main body 2 should be minimized.

When the object H to be inspected by the waterproofness inspection device is a housing of a terminal, there may be no gap between the sub-body 3 and the main body 2, or there may be a fine gap through which water may not penetrate for the waterproof performance of the object H.

In particular, when the housing of the terminal includes a main body 2 and a plurality of sub-bodies 3, the waterproofness inspection device may perform the waterproofness inspection between each of the plurality of sub-bodies 3 and the main body 2.

The main body 2 of the object shown in FIG. 1 may include an outer circumferential portion 4 and a plate body portion 5 connected to the outer circumferential portion 4, and a plurality of openings 1 may be formed in the outer circumferential portion 4. The outer circumferential portion 4 may have a shape of a frame having four walls 6, 7, 8, and 9.

In some examples, as shown in FIG. 1, where five sub-bodies 3 are disposed in one main body 2, the object H may have five inspection areas P1, P2, P3, P4, and P5. The waterproofness inspection device may be configured to inspect these five inspection areas P1, P2, P3, P4, and P5 together.

Figure 2:
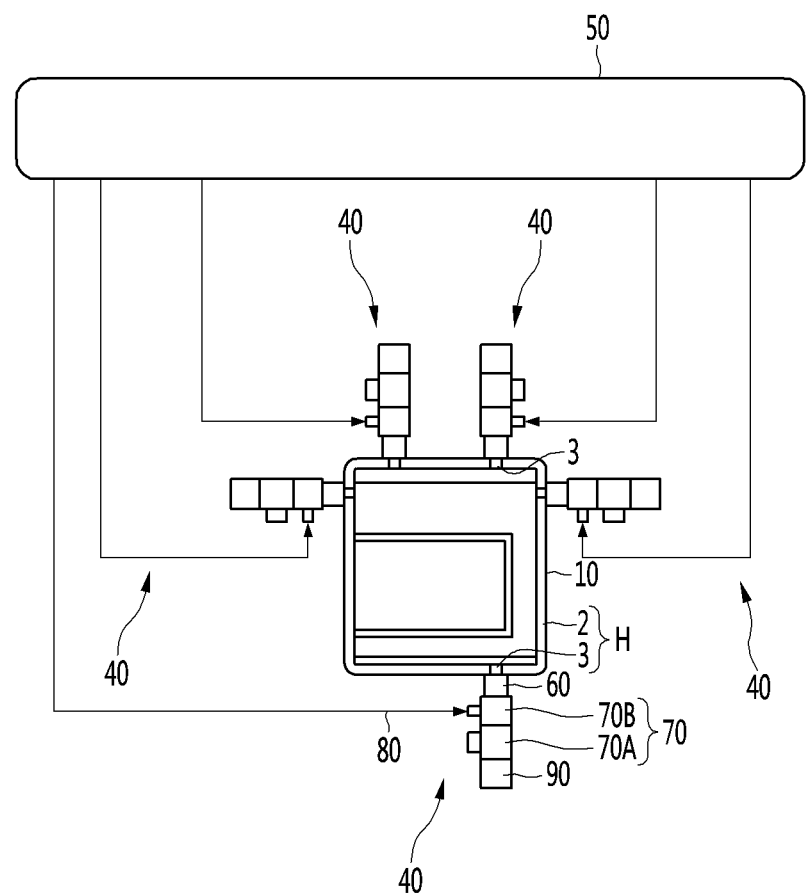
FIG. 2 is a plan view showing an example of a waterproofness inspection device inspecting an example object.
Figure 3:
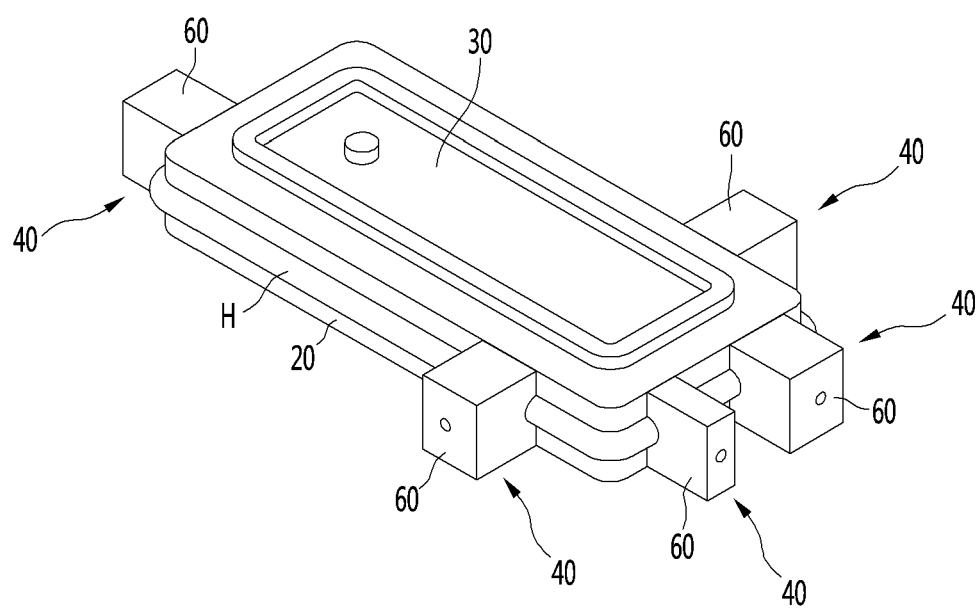
FIG. 3 is a perspective view showing examples of a lower jig, an upper jig, and a jig.
Figure 4:
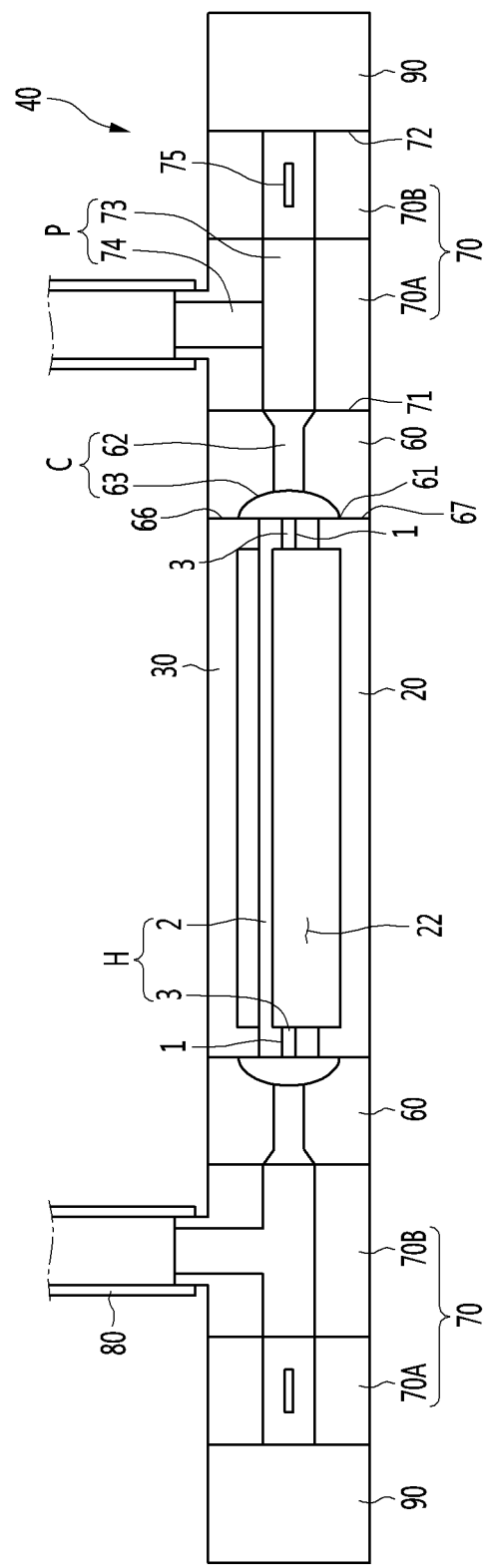
FIG. 4 is a diagram showing an example of an interior of the waterproofness inspection device.
Figure 5:
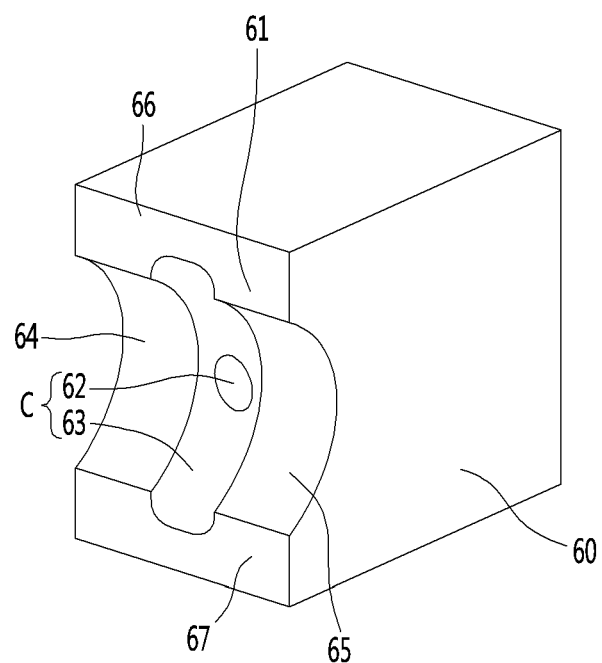
FIG. 5 is a perspective view showing an example of a jig.

FIG. 2 is a plan view showing an example of the waterproofness inspection device inspecting the object, FIG. 3 is a perspective view showing examples of a lower jig, an upper jig, and a jig, FIG. 4 is a diagram showing an example of an interior of the waterproofness inspection device, and FIG. 5 is a perspective view showing an example jig.

The waterproofness inspection device may include a lower jig 20 on which the object H is placed, an upper jig 30 which is in contact with the upper surface of the object H and presses the object H, a plurality of inspection modules 40 that are in contact with the outer surface of the object H, and an air compressor 50.

The air compressor 50 is a device for supplying air to the plurality of inspection modules 40 and may be driven such that the same pressure is formed in all of the plurality of inspection modules 40. The air compressor 50 may supply air such that a pressure of 16 KPa is formed in each of the plurality of inspection modules 40.

The lower jig 20 may be a type of base supporting the object H.

The upper jig 30 may be a cover covering the upper surface of the object H. The upper jig 30 may be disposed above the lower jig 20 to cover the upper surface of the lower jig 20.

A space in which the object H is accommodated may be defined between the lower jig 20 and the upper jig 30. When the lower jig 20 and the upper jig 30 contact the object H, a sealed space 22 may be defined between the lower jig 20 and the upper jig 30.

The plurality of inspection modules 40 may be provided with the same number as the number of inspection areas of the object H. For example, when there are five inspection areas of the object H, the waterproofness inspection device may include five inspection modules 40.

Each of the plurality of inspection modules 40 may include a jig 60, a valve 70, an air supply line 80, and a pressure sensor 90.

The jig 60 may be mounted on at least one of the lower jig 20 and the upper jig 30.

When the object H is seated on the lower jig 20 and the upper jig 30 is in contact with the object H, one surface of the jig 60 may be in contact with the outer surface 10 of the object H, as shown in FIG. 2, and the object H may be supported by the jig 60 such that the location thereof is fixed.

The jig 60 may be in close contact with the outer surface 10 of the object H.

The jig 60 may be formed to be larger than the opening 1, and the surface 61 facing the object H may cover a gap between the main body 2 and the sub-body 3 outside the object H.

A chamber C through which air supplied from the air compressor 50 passes may be formed in the jig 60.

The chamber C may further include a communication passage 62 communicating with a passage P formed in the valve 70, and a groove 63 recessed in the surface 61 that is in contact with the object H.

In some implementations, a leakage between the sub-body 3 and the main body 2 may be detected in a state in which the sub-body 3 is not in contact. To this end, the groove 63 may be formed to be larger than each of the communication passage 62 and the opening 1 and may not be in contact with the sub-body 3.

The jig 60 is in contact with the outer surface of the outer circumferential portion 4 of the object H, and it is also possible to detect a leakage between the outer circumferential portion 4 and the sub-body 3 disposed on the outer circumferential portion 4.

The jig 60 may be in contact with one surface of the plate body portion 5 of the object H to detect a leakage between the plate body portion 5 and the sub-body 3 disposed on the plate body portion 5. In this case, the jig 60 may be mounted to pass through the lower jig 20 or the upper jig 30.

The jig 60 may have main body contact ends 64 and 65 (refer to FIG. 5) that are in contact with the outer surface 10 of the main body 2. The main body contact ends 64 and 65 may be formed on the surface 61 facing the object H. A pair of main body contact ends 64 and 65 may be provided on the jig 60. The pair of main body contact ends 64 and 65 may be formed to be spaced apart from the jig 60 in the horizontal direction.

When the opening 1 is formed in the outer circumferential portion 4 of the object H and the sub-body 3 is disposed on the outer circumferential portion 4, the jig may be disposed to be in contact with the outer circumferential portion 4 of the object H and the outer circumferential portion 4 of the plate body portion 5.

The pair of main body contact ends 64 and 65 may be located next to the groove 63, and the groove 63 may be formed in a recessed shape between the pair of main body contact ends 64 and 65.

The jig 60 may further include an upper jig contact end 66 that is in contact with the outer surface of the upper jig 30, and a lower jig contact end 67 that is in contact with the outer surface of the lower jig 20.

The upper jig contact end 66 may protrude from the upper portion of the surface 61 of the jig 60 facing the object H.

The lower jig contact end 67 may protrude from the lower portion of the surface 61 of the jig 60 facing the object H. The lower jig contact end 67 may be spaced apart from the upper jig contact end 66 in the vertical direction.

The valve 70 may have a passage P communicating with the chamber C.

The jig 60, the valve 70, and the pressure sensor 90 may be arranged in a line, and the valve 70 may be disposed between the jig 60 and the pressure sensor 90, as shown in FIG. 4.

The valve 70 may include a jig facing surface 71 facing the jig 60, and a pressure sensor facing surface 72 facing the pressure sensor 90.

The passage P may include a pressure sensing passage 73 formed from the pressure sensor facing surface 72 to the jig facing surface 71 and communicating with the chamber C, and an air supply passage 74 communicated with one side of the pressure sensing passage 73 and connected to the air supply line 80.

The pressure sensing passage 73 may be a straight passage that is elongated in the longitudinal direction of the inspection module 40.

The air supply passage 74 may be a passage connected in a direction intersecting with the pressure sensing passage 73.

The valve 70 may be an on-off valve that is controlled by a controller 100 to open or close the passage P, as described below. For example, the valve 70 may include a solenoid valve 70A. The valve 70 may further include a valve body defining the passage P, a valve body 75 disposed inside the valve body to open or close the passage P, and a mechanism for rotating or advancing and retreating the valve body 75, in particular, a solenoid.

The valve 70 may include a solenoid valve 70A connected to the pressure sensor 90 and having the passage P formed therein, and a connector 70B disposed between the jig 60 and the solenoid valve 70A, having the passage P formed therein, and connected to the air supply line 80.

The air supply line 80 may connect the valve 70 to the air compressor 50 to guide air to the passage P. The air supply line 80 may be connected to the air supply passage 74, and the air supplied through the air supply line 80 may be introduced into the pressure sensing passage 73 through the air supply passage 74 and may be filled in the pressure sensing passage 73 and the chamber C.

The pressure sensor 90 may be connected to the valve 70 to detect the pressure (e.g., air pressure) in the passage P. The pressure sensor 90 may detect the pressure of the pressure sensing passage 73, and the detection result may be transmitted to the controller 100 to be described below.

Figure 6:
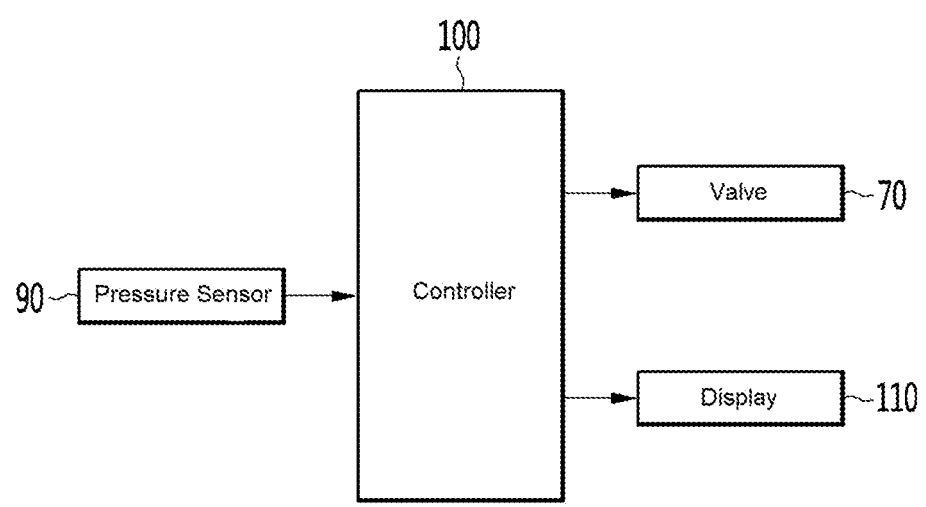
FIG. 6 is a control block diagram of an example of a waterproofness inspection device.

FIG. 6 is a control block diagram of an example of a waterproofness inspection device.

The waterproofness inspection device may further include a controller 100 connected to the pressure sensors 90 of each of the plurality of inspection modules 40 and configured to output data of pressure detected by the pressure sensor 90.

The controller 100 may open the valve 70 during the inspection process of the waterproofness inspection device, and when the inspection process is completed, the controller 100 may close the valve 70 for inspection of another object.

The waterproofness inspection device may further include a display 110 connected to the controller 100 to display data corresponding to pressures detected by the plurality of pressure sensors 90.

For convenience, FIG. 6 illustrates one pressure sensor 90 and one valve 70, but each of the pressure sensor 90 and the valve 70 may be provided with the same number as the number of sub-bodies 3, and data of pressure detected by each of the plurality of pressure sensors 90 may be transmitted to the controller 100.

The controller 100 may display the data of the pressure detected by the plurality of pressure sensors 90 on the display 110 through numerical values or graphs.

The operator may recognize a region having a relatively low pressure among the pressure data displayed on the display 110 as a region having a large amount of leakage, and may quantitatively confirm the amount of leakage through the numerical values of the data.

For example, the controller 100 may be configured to compare the data corresponding to the air pressure of the plurality of inspection modules, and to determine the waterproofness of the object based on comparison of the data corresponding to the air pressure of the plurality of inspection modules. In some examples, the controller 100 may be an electric circuit, an integrated circuit, a processor, a computer, or the like.

In some examples, a waterproofness of an object may relate to a degree or possibility of water leak through an opening or a gap in the object. For example, the waterproofness may refer to a hermetic sealing, airtight coupling, dust proof, etc., or a degree thereof.

In some examples, the waterproofness of a plurality of areas P1, P2, P3, P4, and P5 of an object H having a plurality of sub-bodies 3 may be inspected. The location of the leakage and the amount of leakage may be inspected together by a relative difference between data of the pressures detected by the plurality of pressure sensors 90.

The above description is merely illustrative of the technical idea of the present disclosure, and various modifications and changes may be made thereto by those skilled in the art without departing from the essential characteristics of the present disclosure.

Therefore, the implementations of the present disclosure are not intended to limit the technical spirit of the present disclosure but to describe the technical idea of the present disclosure, and the technical spirit of the present disclosure is not limited by these implementations.

The scope of protection of the present disclosure should be interpreted by the appending claims, and all technical ideas within the scope of equivalents should be construed as falling within the scope of the present disclosure.

What is claimed is:

1. A device configured to inspect an object, the device comprising:
   a lower jig configured to support the object to be inspected;
   an upper jig configured to contact an upper surface of the object and press the object toward the lower jig;
   a plurality of inspection modules configured to contact an outer surface of the object; and
   an air compressor configured to supply air to the plurality of inspection modules,
   wherein each of the plurality of inspection modules comprises:
   a jig that is configured to contact the outer surface of the object and defines a chamber configured to communicate air,
   a valve that defines a passage in communication with the chamber,
   an air supply line that connects the valve to the air compressor and is configured to guide air to the passage, and
   a pressure sensor connected to the valve and configured to detect an air pressure in the passage,
   wherein a width of the jig is larger than an opening defined in a main body of the object, and has a surface configured to face the outer surface of the object and to cover an area between the main body of the object and a sub-body of the object disposed in the opening,
   wherein the chamber comprises:
   a communication passage that is in communication with the passage of the valve, and
   a groove that is recessed from the surface of the jig toward the communication passage, that is connected to the communication passage, and that is configured to face the object, and
   wherein a width of the groove is larger than widths of the communication passage and the opening of the object to thereby enable leakage detection at an interface between the main body of the object and the sub-body of the object, the groove being configured to be spaced apart from the sub-body of the object.

2. The device according to claim 1, wherein the jig further comprises:
   an upper jig contact end configured to contact an outer surface of the upper jig; and
   a lower jig contact end configured to contact an outer surface of the lower jig.

3. The device according to claim 1, wherein the jig, the valve, and the pressure sensor are disposed in a row.

4. The device according to claim 1, wherein the lower jig and the upper jig are configured to contact the object to thereby define a sealed space with the object disposed between the lower jig and the upper jig, and
   wherein outer surfaces of the lower jig and the upper jig are configured to be positioned inward relative to the outer surface of the object.

5. The device according to claim 1, wherein the jig comprises a main body contact end that is disposed at the surface of the jig facing the object and that is configured to contact an outer surface of the main body of the object.

6. The device according to claim 5, wherein the main body contact end is recessed from the surface of the jig facing the object,
   wherein the groove is further recessed from the main body contact end in a direction away from the object, and
   wherein the communication passage is defined within the groove and extends to the passage of the valve.

7. The device according to claim 1, wherein the valve comprises a first surface facing the jig, and a second surface facing the pressure sensor.

8. The device according to claim 7, wherein the passage of the valve comprises:
   a pressure sensing passage that extends from the first surface to the second surface of the valve and is in communication with the chamber of the jig; and
   an air supply passage that is in communication with the pressure sensing passage and connected to the air supply line.

9. The device according to claim 8, wherein the pressure sensing passage of one of the plurality of inspection modules is a straight passage that extends along a longitudinal direction of the one of the plurality of inspection modules.

10. The device according to claim 1, further comprising a controller connected to the pressure sensor of each of the plurality of inspection modules and configured to output data corresponding to the air pressure detected by the pressure sensor.

11. The device according to claim 10, wherein the controller is configured to determine waterproofness of the object based on the data corresponding to the air pressure.

12. The device according to claim 10, wherein the controller is configured to:
compare the data corresponding to the air pressure of the plurality of inspection modules; and
determine waterproofness of the object based on comparison of the data corresponding to the air pressure of the plurality of inspection modules.

13. A device configured to inspect an object including a main body having a plurality of openings and sub-bodies disposed in the plurality of openings, the device comprising:
a lower jig and an upper jig that are configured to support the object and to define a sealed space with the object disposed between the lower jig and the upper jig;
a plurality of inspection modules configured to be positioned at the plurality of openings of the object and to contact an outer surface of the object; and
an air compressor configured to supply air to the plurality of inspection modules,
wherein each of the plurality of inspection modules comprises:
a pressure sensor configured to detect air pressure between one of the plurality of inspection module and the outer surface of the object,
a jig that is configured to contact the outer surface of the object and defines a chamber configured to communicate air, the jig being configured to cover an area between the main body of the object and one of the sub-bodies,
a valve that defines a passage in communication with the chamber, and
an air supply line that connects the valve to the air compressor and is configured to guide air to the passage,
wherein the pressure sensor is connected to the valve and configured to detect the air pressure in the passage of the valve,
wherein a width of the jig is larger than an opening defined in a main body of the object, and has a surface configured to face the outer surface of the object and to cover an area between the main body of the object and a sub-body of the object disposed in the opening,
wherein the chamber comprises:
a communication passage that is in communication with the passage of the valve, and
a groove that is recessed from the surface of the jig toward the communication passage, that is connected to the communication passage, and that is configured to face the object, and
wherein a width of the groove is larger than widths of the communication passage and the opening of the object to thereby enable leakage detection at an interface between the main body of the object and the sub-body of the object, the groove being configured to be spaced apart from the sub-body of the object.

14. The device according to claim 13, wherein the jig is configured to contact the upper jig, the lower jig, and the object disposed between the upper jig and the lower jig.

15. The device according to claim 13, further comprising a controller connected to the pressure sensor of each of the plurality of inspection modules and configured to output data corresponding to the air pressure detected by the pressure sensor.

16. The device according to claim 15, wherein the controller is configured to:
compare the data corresponding to the air pressure of the plurality of inspection modules; and
determine waterproofness of the object based on comparison of the data corresponding to the air pressure of the plurality of inspection modules.

17. The device according to claim 13, wherein the jig comprises a main body contact end that is disposed at the surface of the jig facing the object and that is configured to contact an outer surface of the main body of the object.

18. The device according to claim 17, wherein the main body contact end is recessed from the surface of the jig facing the object,
wherein the groove is further recessed from the main body contact end in a direction away from the object, and
wherein the communication passage is defined within the groove and extends to the passage of the valve.

* * * * *